United States Patent [19]
Pontello

[11] 3,736,790
[45] June 5, 1973

[54] APPARATUS FOR NON-DESTRUCTIVELY TESTING FUEL FILTERS

[76] Inventor: Anthony P. Pontello, 447 Thomson Avenue, Springfield, Pa. 19064

[22] Filed: Aug. 26, 1971

[21] Appl. No.: 175,238

[52] U.S. Cl. ................73/37, 73/40.7, 250/219 DF, 356/237
[51] Int. Cl. ............................................G01m 3/38
[58] Field of Search.......................73/37, 40, 40.7; 356/237; 250/219 DF

[56] References Cited

UNITED STATES PATENTS

| | | | |
|---|---|---|---|
| 2,842,957 | 7/1958 | Bacon, Jr. | 73/37 |
| 3,203,229 | 8/1965 | Pevar | 73/40 |
| 3,407,123 | 10/1968 | Peterson | 73/40 X |
| 3,625,656 | 12/1971 | Paulson | 73/40 X |

FOREIGN PATENTS OR APPLICATIONS 1,147,376   4/1969   Great Britain............................73/37

*Primary Examiner*—Richard C. Queisser
*Assistant Examiner*—Joseph W. Roskos
*Attorney*—R. S. Sciascia and A. W. Collins

[57] ABSTRACT

Subject invention relates to novel and improved apparatus for non-destructible detection of flaws in aircraft fuel filtering or coalescing elements. The improved apparatus provides for the conduction of heated pressurized air through the coalescer element to be tested into contact with a plastic film which is positioned about the outer peripheral surface of the coalescer element. The outer surface of the film is coated with a predetermined cholesteric liquid crystal material or a combination of the same. Flaws present in the coalescer element produce uneven conditions of the heated air flow through the coalescer and temperature gradients on the liquid crystal coated film. Resulting color patterns on the coated film identify the location and nature of flaws in the coalescer element.

8 Claims, 3 Drawing Figures

PATENTED JUN 5 1973

3,736,790

INVENTOR.
ANTHONY P. PONTELLO
BY
Arthur L. Collins
ATTORNEY

APPARATUS FOR NON-DESTRUCTIVELY TESTING FUEL FILTERS

The invention described herein may be manufactured and used by or for the Government of the United States of America for governmental purposes without the payment of any royalties thereon or therefor.

Filtering and coalescing elements are often used in aircraft fuel systems to filter out solid contaminants and free water in the fuel. The reliability and efficiency of these coalescing devices is an important consideration in the over-all performance and operation of the aircraft engine. A high level of quality control by the manufacturer supported by a 100 percent test and inspection of production is therefore often desirable. Although various methods of inspecting and testing fuel coalescing devices have been used in the past, many flaws and imperfections in the coalescers are hidden from visual inspection and no suitable non-destructive test has heretofore been developed.

It is therefore a principal object of the invention to provide novel and improved apparatus for non-destructively testing aircraft fuel coalescer elements.

It is a further object of the invention to provide novel and improved aircraft fuel coaslescer test apparatus in which heated pressurized air is passed through the coalescer to be tested onto a surface coated with a cholesteric liquid crystal material that provides color patterns in the vicinity of any coalescer flaw.

Other objects and many of the attendant advantages of this invention will be readily appreciated as the same becomes better understood by reference to the following detailed description when considered in connection with the accompanying drawing wherein.

Figure 1:
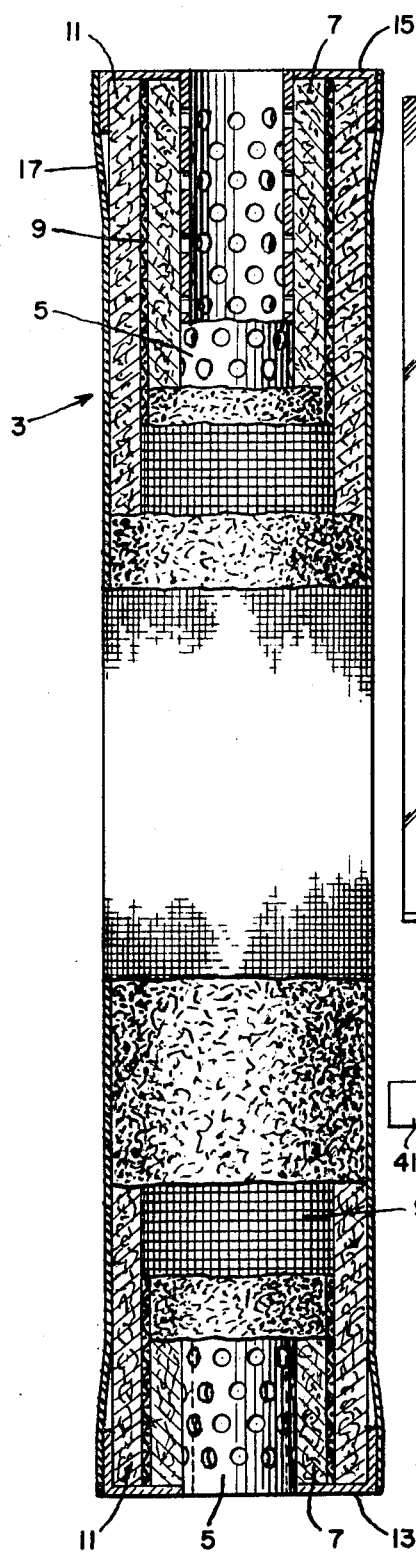
FIG. 1 is a partial cross-sectional view of a coalescer element utilized in the present invention.

Referring now to the various figures of the drawing, the coalescer device 3, which is to be tested with the apparatus of the invention, contains a perforated center tube 5 that forms the core of the coalescer. A first layer of glass fibers 7 of predetermined thickness and density is formed around the outer periphery of the tube 5. The fine mesh wire cloth 9 is helically wrapped around the layer of glass fibers 7 and is sandwiched between the first layer of glass fibers 7 and a second layer of glass fibers 11 formed on the outer peripheral surface of the wire cloth. The component parts of the coalescer are secured together by the annular end caps 13 and 15 and a soft textured cotton sock 17 is wrapped about the exterior of coalescer device 3.

While designs of coalescer devices vary considerably, their basic functional characteristics are similar. Thus, although the invention is disclosed in the test of the above described commonly used coalescer device, coalescers of various other designs could be similarly tested without departing from the spirit or scope of the invention.

Figure 2:
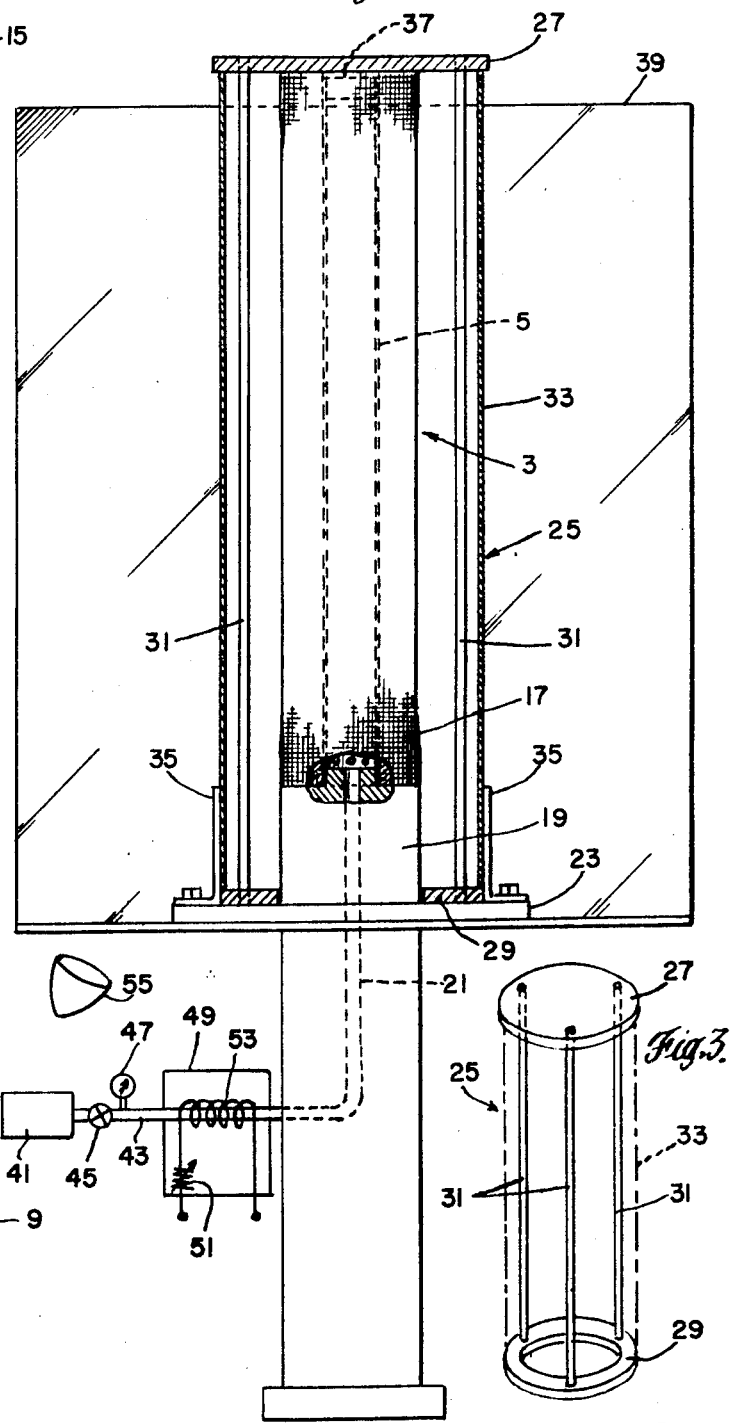
FIG. 2 is a diagrammatic arrangement of a test structure for non-destructive testing of the coalescer element shown in FIG. 1.
Figure 3:
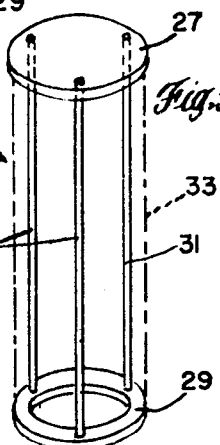
FIG. 3 is a view of the housing of FIG. 2.

One open end of the coalescer device 3 which is tested in accordance with the invention is positioned as shown in FIG. 2 of the drawing on the stepped base or pedestal 19. The aperture 21 that extends downwardly and axially from the upper surface of the pedestal 19 and then outwardly through its lateral cylindrical surface provides a path for the flow of heated pressurized air to the interior of the coalescer in a manner which will be more apparent hereinafter when it is positioned on the pedestal. The enlarged flange 23 that extends outwardly from the outer peripheral surface of the pedestal 19 supports the cylindrical housing 25 which encloses the coalescer 3 during the test. The housing 25 consists of aluminum upper and lower cylindrical end members 27 and 29 which are interconnected by the three equally spaced, elongated aluminum strips 31. The 0.25 to 0.75 mil thick polyethylene terephthalate film 33, known in the art as "Mylar," is wrapped around the aluminum strips 31 to provide a continuous enclosure for the coalescer element 3. The exterior surface of the film 33 is coated with a 0.5 to 2 mil layer of a cholesteric liquid crystal material which is described in greater detail hereinafter. The right-angled clip elements 35 secured as shown to the upper surface of the flange 23 concentrically position the housing 25 on the flange 23 with respect to the coalescer element 3. End cap member 37 is secured over the upper open end of the coalescer 3 in any suitable manner. The mirror 39 positioned behind the housing 25 facilitates inspection of the full peripheral circumference of the film 33 during the test.

The pressurized air source 41 is connected to the aperture 21 in the pedestal 19 by the air pressure line or conduit 43. The valve 45 in the air line 43 and the pressure gauge 47 connected thereto provide adjustment and control of the pressure of the air used in the test. The air line 43 extends through the heating device 49 which includes the variable rheostat 51 and heating coil 53 or any other suitable air heating apparatus. The florescent light source 55 is placed in any suitable position so as to illuminate the enter outer surface of the coated film 33.

The cholesteric liquid crystal material which is used to coat the film 33 is a substance that is sensitive to changes in temperature in a predetermined temperature range. Due to dynamic changes of the molecules of the material at low energy states of excitation, a small change in temperature of the film 33 causes a change in the molecular structure of its liquid crystal material coating and a change in color of light reflected from the film. Cholesteric liquid crystal materials which are suitable for use on the film 33 in the practice of the invention include derivatives and compounds of cholesterol. Mixtures of two or more cholesterol compounds are preferably used to obtain high thermal sensitivity within a particular desired temperature range. Examples of cholesterol compounds used in various proportions to obtain liquid crystal materials suitable for use in the invention include cholesteryl acetate, cholesteryl acetoacetate, cholesteryl benzoate, cholesteryl n-butyrate, cholesteryl caproate, cholesteryl caprylate, cholesteryl chloride, cholesteryl chloroacetate, cholesteryl chlorofomate, cholesteryl cinnamate, cholesteryl n-decylate, cholesteryl 2,4-dichlorobenzoate, cholesteryl formate, cholesteryl n-heptylate, cholesteryl hydrocinnamate, cholesteryl hydrogen phthalate, cholesteryl hydrogen succinate, cholesteryl isobutyrate, cholesteryl laurate, cholesteryl myristate, cholesteryl oleate, cholesteryl oleyl carbonate, cholesteryl palmitate, cholesteryl pelargonate, cholesteryl phenylacetate, cholesteryl n-propionate, cholesteryl stearate, and cholesteryl n-valerate. Small quantities of filler materials including carbon and carbon black are optionally mixed with the cholestrol material to provide a darkened base or background for improved observation of the changing color patterns on the film 33 during the test.

In the practice of the invention, the coalescer element 3 which is to be tested is placed on the pedestal 19 of the apparatus. The liquid crystal coated housing 33 is then positioned over the coalescer element 3 and properly positioned on the flange 23 by clip elements 35. End cap member 37 is then secured on the upper open end of the coalescer element 3. Rheostat 53 is then adjusted so as to develop sufficient current in coil 51 to heat the air from source 41 to a predetermined degree of temperature above the sensitive temperature range of the cholesteric liquid crystal coating on film 33. Valve 45 is then adjusted to deliver air from the source 41 to the interior of the coalescer element 3 at a pressure of 15 to 90 psi so that the air is applied over the entire working surface of the coalescer element. Heated pressurized air passes through the coalescer element 3 and produces temperature gradients on the film 33 where flaws and imperfections are located in the coalescer. As the temperature on the exterior surface of the film increases and passes through the sensitive temperature range of the cholesteric liquid crystal coating on the film 33, the temperature gradients produce changing color patterns on the coated film that identify the nature and location of the flaw. Light from the florescent light source 55 illuminates the film 33 without significantly affecting the temperature pattern over its surface.

Obviously, many modifications and variations of the present invention are possible in the light of the above teachings. It is therefore to be understood that within the scope of the appended claims, the invention may be practiced otherwise than as specifically described.

What is claimed is:

1. Apparatus for detecting flaws in aircraft fuel coalescer elements, said apparatus comprising:
   a. a source of pressurized air;
   b. means for heating air from the source to a predetermined temperature;
   c. means for closing one end of the coalescer element;
   d. means for coupling the heated pressurized air source to the other end of the coalescer element;
   e. a plastic film which is positioned about the outer periphery of the coalescer element, the outer peripheral surface of the film being coated with a cholesteric liquid crystal material;
   f. and a source of light which is directed toward the outer peripheral surface of the coated film.

2. The apparatus substantially as described in claim 1 wherein the air from the source is heated to a temperature of approximately 180° F.

3. The apparatus substantially as described in claim 1 wherein the pressure of the air from the air source is between 15 and 90 psi.

4. The apparatus substantially as described in claim 1 wherein the plastic film is between 0.25 and 0.75 mils in thickness.

5. The apparatus substantially as described in claim 1 wherein the plastic film is polyethylene terephthalate.

6. The apparatus substantially as described in claim 1 wherein the liquid crystal coating on the film is between 0.5 and 2 mils in thickness.

7. The apparatus substantially as described in claim 1 wherein the liquid crystal material is thermally sensitive between 113° and 135° F.

8. The apparatus substantially as described in claim 1 wherein the source of light is a florescent light.

* * * * *

UNITED STATES PATENT OFFICE
CERTIFICATE OF CORRECTION

Patent No. 3,736,790          Dated August 29, 1973

Inventor(s) Anthony P. Pontello

It is certified that error appears in the above-identified patent and that said Letters Patent are hereby corrected as shown below:

On the cover page, left hand column and above the line marked "[22]", insert

-- [73] Assignee: The United States of America as represented by the Secretary of the Navy --

Signed and sealed this 20th day of November 1973.

(SEAL)
Attest:

EDWARD M. FLETCHER, JR.
Attesting Officer

RENE D. TEGTMEYER
Acting Commissioner of Patents